June 15, 1965     W. ROTH     3,188,862
FLOWMETERS Filed Jan. 14, 1958     4 Sheets-Sheet 1

INVENTOR
BY Wilfred Roth
ATTORNEYS

June 15, 1965  W. ROTH  3,188,862
FLOWMETERS
Filed Jan. 14, 1958  4 Sheets-Sheet 2

INVENTOR
Wilfred Roth
BY
ATTORNEYS

June 15, 1965 W. ROTH 3,188,862
FLOWMETERS
Filed Jan. 14, 1958 4 Sheets-Sheet 3

INVENTOR
Wilfred Roth
BY
ATTORNEYS

United States Patent Office 3,188,862
Patented June 15, 1965

3,188,862
FLOWMETERS
Wilfred Roth, % Roth Laboratory for Physical Research, 1240 Main St., West Hartford, Conn.
Filed Jan. 14, 1958, Ser. No. 708,827
6 Claims. (Cl. 73—194)

This invention relates to flowmeters for measuring the flow of fluids. While the invention is especially directed to the provision of a mass flowmeter, certain features thereof are useful in velocity and volume flowmeters as well.

There is extensive use at the present time of apparatus capable of measuring the flow of fluids. Many such instruments measure the volume flow of fluids in a conduit and often take the form of a fluid velocity measuring device giving an output which, when multiplied by the cross-section of the conduit and a suitable proportionality constant, yields volume flow. While such instruments are valuable for many purposes, there are many applications where the measurement of mass flow is required, particularly when the fluid density varies.

For example, in many industrial processes it is mass of a reagent that is important rather than merely volume. Another example is in the marketing of fluids according to their mass rather than volume. A further example is in engines employing fluids as an energy source, where proper operation under varying conditions may be a function of fluid mass rather than volume.

Mass flow is the product of volume flow and density, and the density may vary depending upon the exact constituents of the fluid, and usually varies considerably with temperature. Thus, the conversion of volume flow to mass flow is often difficult. Even when such conversion is possible, it is advantageous to have an instrument which indicates mass flow directly.

Various types of flowmeters have been suggested, and many of them require the insertion of measuring elements or moving parts in the fluid stream. This impedes the flow of fluid and is often a serious disadvantage. Other suggested devices have disadvantages such as complicated and expensive mechanisms, heavy weight, insufficient accuracy, etc.

It is a primary object of the present invention to provide a relatively simple and accurate flowmeter which is light-weight and does not require the introduction of any measuring elements or moving parts in the fluid stream.

In accordance with the invention, means are provided for projecting a beam of sonic energy across the fluid stream, and measuring the displacement of the beam due to the flowing fluid. This displacement is proportional to fluid velocity and hence can be used to indicate velocity flow. The displacement is also a function of the velocity of propagation of the sonic waves in the fluid medium. If the velocity of propagation is known, and remains constant for a given application, a suitable proportionality constant can be employed to measure fluid velocity. Then, by introducing a suitable proportionality constant for the cross-sectional area of the fluid stream, volume flow can be measured.

For many applications the velocity of propagation will not remain constant and must be measured simultaneously with the measurement of beam displacement in order to obtain an accurate measurement of flow velocity.

For measuring mass flow, the density of the fluid must also be known or measured. In accordance with a feature of the present invention, the specific impedance or characteristic impedance of the fluid is measured simultaneously with the measurement of displacement, and the measurements are combined to yield an indication of mass flow directly. Other features of the invention are described hereinafter in connection with embodiments thereof.

The terms "specific acoustic impedance" and "characteristic impedance" of a fluid are sometimes used interchangeably, and sometimes given somewhat different meanings. Thus some authorities apply the term "specific acoustic impedance" to the quantity $p/u$, where $p$ is the effective sound pressure at a point in an acoustic medium and $u$ is the effective particle velocity at that point. The term "characteristic impedance" is then applied to the quantity $\rho c$, where $\rho$ is the density of the fluid and $c$ is the speed of sound in the fluid. When used in this manner, the characteristic impedance is a special case of the specific acoustic impedance, and is the specific acoustic impedance for a plane progressive wave.

In accordance with the present invention the quantity $\rho c$ is utilized in the determination of mass flow, and the term "characteristic impedance" will be employed.

The invention is especially directed to the measurement of flow of liquids, but may also be applied to gases. The frequency of the sonic waves may be selected to meet the requirements of a particular application. For liquid flow, frequencies in the ultrasonic region are usually preferable. Frequencies in the high ultrasonic region, say 1–10 megacycles, are advantageous for many applications inasmuch as narrow beams may be obtained at such frequencies with small transducers. For gaseous flow, frequencies in the audible or low ultrasonic regions will usually be preferable. As used herein, the term "sonic" applies to waves and frequencies in both audible and ultrasonic regions.

The invention will be more fully understood by reference to the following detailed description of specific embodiments thereof taken in conjunction with the drawings, in which.

Figure 1:
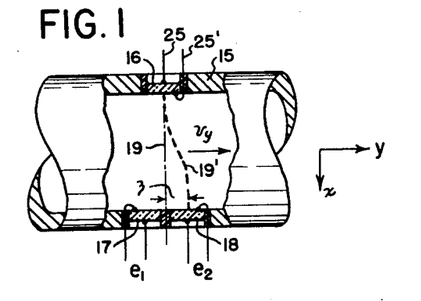
FIG. 1 is a detail showing a fluid conduit with transmitting and receiving transducers.

Referring now to FIG. 1, a section of fluid conduit 15 is shown in which a fluid stream flows with velocity $v_y$. A transmitting transducer 16 is mounted to transmit a beam of sonic energy across the conduit. A pair of receiving transducers 17, 18 are positioned to receive the sonic beam after the beam passes across the fluid stream. These receiving transducers are spaced in the direction of fluid flow.

The cross-sectional shape of the conduit may be selected as desired, and is here shown circular. Various types of sonic transducers are known in the art and may be employed as meets the requirements of a particular application. The transducers here shown are piezoelectric crystals mounted in the wall of conduit 15 so as not to impede the flow of fluid therein.

As shown, receiving transducers 17, 18 are separate but mounted closely adjacent to each other. It is possible for certain of the transducer elements to be in common, while preserving essentially separate responses. For example, a single piezoelectric crystal with a common electrode on one face and two separate electrodes on the other face to give separate responses may be employed if desired. It will be understood that such an arrangement functions as two transducers.

Instead of mounting the transducers in holes in the conduit, in many cases they can be mounted on the outside surface of the conduit and satisfactory operation obtained. The sonic wave then propagates through the wall from transducer to fluid and vice versa. Advantageously, in such cases, the conduit wall is made an integral number of half-wavelengths thick at the operating frequency so that the impedance presented to the transducer is equal to that at the interface between the conduit wall and the fluid, thereby substantially eliminating the effect of the conduit wall on the operation of the system.

If the conduit is filled with fluid but the velocity is zero, the sonic beam transmitted by 16 will travel directly across the conduit as indicated by line 19, representing the center of the beam. With identical receiver transducers 17 and 18 symmetrically located with respect to line 19, their outputs will be equal if the transmitted beam is symmetrical in the forward and reverse directions with respect to line 19. If, however, the fluid is flowing, the sonic beam will be displaced in the direction of fluid flow and will be somewhat downstream of its initial position when it arrives at the receiving transducers, as indicated by line 19'.

As is well known, the fluid velocity in a conduit is not constant at all points of a given cross-section. At the walls fluid velocity is zero, and at the center it is a maximum. If the sonic beam is perpendicular to the wall at the transmitter, the velocity of propagation at any point in its path will have two orthoginal components $v_x$ and $v_y$. The component $v_x$ is directly across the conduit and is a constant equal to $c$, the velocity of propagation of the sonic beam in the fluid. The component $v_y$ is along the direction of flow and equal to the flow velocity. Since it varies across the conduit as a function of $x$, it may be denoted $v_y(x)$. The resultant velocity of propagation of the beam at any point will be the vector sum of the two components, and its direction can be expressed as:

$$\tan \theta = \frac{v_y(x)}{c} \quad (1)$$

where $\theta$ = angle with respect to the undisplaced axis 19 of the beam (zero flow velocity).

With the aid of Equation 1 it can be shown that the displacement of the beam axis, $\eta$, in a direction parallel to the axis of the conduit, is:

$$\eta = \frac{1}{c}\int_0^x v_y(x)\,dx \quad (2)$$

The velocity distribution across the conduit represented by the term $v_y(x)$, will depend upon the flow velocity and upon the conduit employed, particularly its cross-section, as is well known in the art. For example, with laminar flow in a pipe of circular cross-section, the flow velocity along a diameter has a parabolic velocity profile. In this case, the axial shift of the beam in the direction of flow is:

$$\eta = \frac{2D}{3}\frac{v_{max}}{c} \quad (3)$$

where $D$ = pipe diameter, and
$v_{max}$ = maximum velocity of flow, which occurs at the center of the pipe.

It will be clear from Equations 2 and 3 that if $c$ is constant, the beam displacement $\eta$ will vary as a function of the fluid velocity only. Thus, for a given conduit, volume flow will also vary as a function of beam displacement. For a given application, the function can be determined either mathematically or by calibration. In some instances it may suffice to use an arbitrary calibration.

From Equation 1 it will be seen that whenever the flow velocity is zero, $\theta$ is zero and the beam is perpendicular to the wall of the pipe. Thus, if the beam at the transmitter transducer 16 is perpendicular to the conduit wall, the beam will also be perpendicular to the wall at the receiver crystals 17, 18, since fluid velocity at the wall is zero due to stagnant boundary layers. This is important since it greatly reduces any problems relating to the polar response patterns of the receiving crystals. Furthermore, with perpendicular incidence, if the receiver crystals are properly mounted maximum sensitivity will be obtained, since the maximum value of the polar response pattern commonly occurs in a direction normal to the crystal.

The actual displacement of the beam will depend upon pipe diameter, rate of fluid flow, and the velocity of propagation of sonic waves in the fluid. For a wide range of values, the displacements will be of the order of a few thousandths of an inch. For example, if water flows at the rate of 2000 gallons per hour in a pipe of 1.5" diameter, a displacement of about 2.5 mils will be produced. With a 6" pipe, and 80,000 gallons of water per hour, a displacement of the order of 23 mils will be produced. Since these displacements are small, relatively small crystals and fairly sharp beams may be employed.

Figure 2:
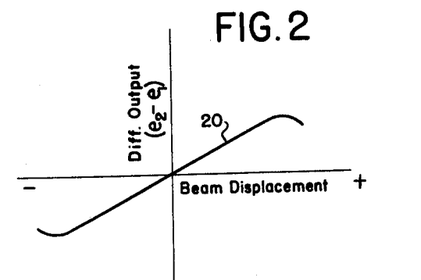
FIG. 2 is an illustrative curve showing the manner in which the difference in outputs of the receiver transducers varies with beam displacement.

Beam displacement may be measured by obtaining the difference between the outputs of receiver transducers 17 and 18. Referring to FIG. 2, curve 20 illustrates the manner in which the difference between the outputs of crystals 17 and 18 varies with beam displacement. For zero displacement each crystal receives the same amount of beam energy and the difference is zero. When the beam is shifted in the down-stream direction, crystal 18 produces a greater output than 17, and the difference between the outputs $(e_2-e_1)$ is positive. If the fluid flow were reversed in direction, the difference in the outputs would be in the opposite direction and is shown negatively.

With a beam of rectangular cross-section somewhat smaller in area than a receiver crystal, the difference in outputs will vary linearly with beam displacement over a considerable range. If the beam cross-section is not rectangular, curve 20 may not be linear, but the difference in outputs will vary as a definite function of beam displacement. This can be taken into account in calibrating the instrument.

As stated before and as shown in the above equations, the displacement produced by a given rate of flow will vary with the velocity of propagation $c$. The velocity of propagation is different for different types of fluid. It also varies considerably with fluid temperature and with fluid density. Consequently, for general applications it is desirable to measure $c$. Also, in order to indicate mass flow rather than merely volume flow, it is desirable to measure density.

As indicated hereinbefore, the characteristic impedance of a fluid is proportional to $\rho c$. Accordingly, if the characteristic impedance is measured and the displacement of the beam is also measured, multiplying the two quantities will give, in the general case expressed by Equation 2, the following equation:

$$\rho c \eta = \rho \int_0^x v_y(x)\, dx \quad (4)$$

In the specific case of a circular conduit for which Equation 3 applies, the multiplication will give:

$$\rho c \eta = \frac{2}{3} D \rho v_{\max}. \quad (5)$$

When multiplied by the cross-sectional area of the conduit, Equations 4 and 5 give the product of density and rate of volume flow, which is the rate of mass flow. Appropriate proportionality constants will of course be present, and are taken into account in the calibration of the instrument.

Figure 4:
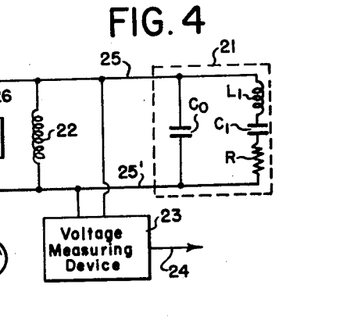
FIG. 4 is a detail explanatory of one way of measuring the characteristic impedance of a fluid.

Various means may be employed for measuring the characteristic impedance. One such means is shown in FIG. 4. With a piezoelectric crystal operated in the region of its resonant frequency, its equivalent circuit can be drawn as shown in the dotted box 21. Here $C_0$ is the static capacitance of the crystal. The inductance $L_1$ is the effective mass and the capacitance $C_1$ is the stiffness of the crystal, both transformed into electrical terms. The resistance R includes the losses in the crystal itself and the load presented to the crystal by the fluid with which it is in contact. With a low loss crystal, the resistance R represents substantially only the load impedance. Hence its value is directly proportional to the characteristic impedance of the fluid if standing waves are avoided or rendered negligible.

With continuous wave (CW) transmission, standing waves can be reduced by matching the receiver transducers as closely as possible to the fluid impedance, by slightly tilting the receiver transducers so that any reflected energy will not be returned to the transmitting transducer, etc. Such expedients, together with energy absorption in the fluid, suffice for many applications. Or, pulse transmission may be employed and the pulse length made less than the propagation time for the pulse to travel from transmitter to receiver and be reflected back.

The value of resistance R can be measured in many ways, as will be clear to those skilled in the art. One simple method is shown in FIG. 4. The operating frequency is selected to be at or near the natural resonant frequency of the crystal, determined by the constants $L_1$ and $C_1$. An inductance 22 is shunted across the crystal and its value selected to resonate with the static capacitance of the crystal, $C_0$, at the operating frequency. Thus the resonant circuit comprising inductance 22 and capacitance $C_0$ is effectively a shunt resistance. With a low-loss inductance 22, the Q of this resonant circuit may be made high compared ot the loaded mechanical Q of the crystal (the Q of the series circuit $L_1$, $C_1$ and R) and consequently the equivalent shunt resistance can be made sufficiently high to be neglected.

At resonance, the impedance of the series circuit $L_1$, $C_1$ and R will be substantially equal to R. Hence, the resultant impedance connected across oscillator 26 is substantially a resistance whose value is proportional to the load impedance, and hence proportional to the characteristic impedance of the fluid.

The value of this resistance may readily be measured by employing a constant current driving source, that is, a source whose current output does not change appreciably with variations in the load impedance. This can be accomplished by making the output impedance of oscillator 26 highb compared to the load impedance of the crystal. Then, by measuring the output voltage across lines 25, 25' the value of resistance R can be determined. Any suitable voltage measuring device 23 can be employed for the purpose. Advantageously, the input impedance of the voltage measuring device 23 is sufficiently high so as not to affect the measurement, and means are provided for rectifying the oscillator frequency so as to obtain a D.-C. output in line 24 which is proportional to the characteristic impedance of the fluid. To this end, an amplifying stage having a high input impedance, followed by a diode detector circut, may be employed in the measuring device 23.

If desired, the power input to the crystal could be measured, with constant applied current or voltage, in order to measure R.

Figure 3:
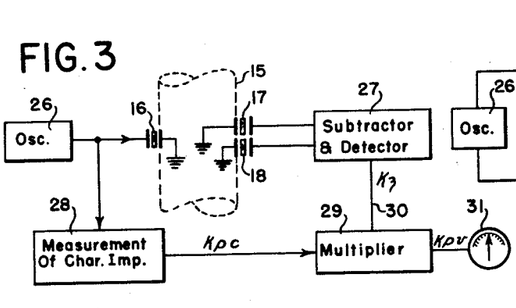
FIG. 3 shows an embodiment of the invention for the measurement of mass flow.

Referring now to FIG. 3, transmitter crystal 16 is energized by an oscillator 26 either directly or through an amplifier. The oscillator frequency may be selected for the particular application and will commonly be in the ultrasonic region. Continuous wave or pulse operation may be employed. The outputs of the receiver crystals 17 and 18 are supplied to a subtractor 27 so as to obtain an output in line 30 proportional to the difference between the crystal outputs. Many forms of subtractors are known in the art and may be employed as desired. The output in line 30 is proportional to beam displacement, as explained hereinbefore.

The characteristic impedance of the fluid is also measured by suitable means generally indicated as 28. This may take the form explained in connection with FIG. 4. The output of 28 will then be proportional to $\rho c$ as indicated. This quantity and the output of subtractor 27 are supplied to a multiplier 29 and will yield an output proportional to $\rho v$, and is hence proportional to the rate of mass flow. This can be indicated directly by any suitable meter 31. If total mass flow rather than rate of mass flow is desired, meter 31 can be of a type which integrates with time.

Electrical, mechanical and electro-mechanical multipliers are known in the art, and the outputs representing beam displacement and characteristic impedance can be suitably converted, if necessary, to suit the multiplier selected. With electrical inputs, it is often more convenient to employ D.-C. signals. Hence subtractor 27 is shown as including a detector to yield a D.-C. output.

The subtraction may also be performed electrically, mechanically, etc. The A.-C. outputs of crystals 17, 18 may be subtracted directly, or may first be converted to corresponding D.-C. signals by detection and then subtracted.

While the arrangement of FIG. 3 may be useful for many applications, as shown it is subject to error if the beam power at the receiver transducers changes due to changes in attenuation of the beam as it passes through the fluid. Various arrangements can be employed to eliminate this possible source of error, one of which is shown in FIG. 5.

Figure 5:
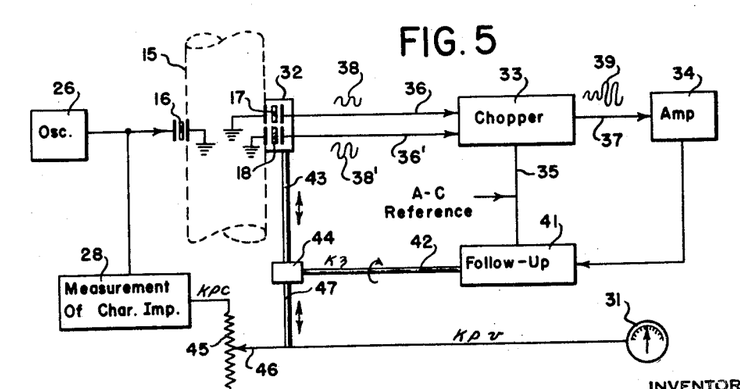
FIG. 5 is another embodiment in which the receiver transducers are displaced in a null-type system.

In FIG. 5 the receiver crystals are mounted on a support 32 so as to maintain a fixed spacing between the crystals, but the support 32 is movable in the axial direction with respect to conduit 15. The outputs of the two crystals are supplied to a chopper which feeds the crystal outputs alternately to amplifier 34. An A.-C. reference voltage is supplied through line 35 to the chopper and controls the operation thereof. The chopper may take many forms known in the art. For example, a switching relay energized by the reference voltage in line 35 may be arranged to connect the outputs of the receiver crystals in lines 36, 36' alternately to the output line 37 leading to amplifier 34.

As is well understood in the art, if the outputs of the two receiver crystals 17 and 18 are equal, the output in line 37 will be an A.-C. wave of constant amplitude and of frequency equal to the operating frequency of the oscillator 26. On the other hand, if the output of transducer 18 is greater than that of 17, as indicated diagrammatically at 38, 38', the output of the chopper in line 37 will vary in amplitude at the switching frequency produced by the A.-C. reference in line 35. This is shown diagrammatically at 39.

The amplified output from 34 is then supplied to a follow-up device 41 which is arranged to respond only to the envelope of the wave 39. Where necessary, the output of amplifier 34 can be rectified and filtered so that only the envelope frequency is supplied to the follow-up device. The A.-C. reference signal is also supplied to the follow-up device. The follow-up has an output shaft 42 which rotates in one direction or the other whenever the outputs of crystals 17 and 18 are unequal, the direction of rotation being determined by which signal is the greater.

Output shaft 42 is coupled to rod 43 through a suitable mechanical gear box, etc. 44 so that rotation of shaft 42 moves rod 43 in the axial direction of the conduit. The rod is connected to support 32 so that the crystals are displaced axially of the conduit until the crystal outputs are equal. The angular displacemen of shaft 42 is then proportional to the displacement of the ultrasonic beam.

As in FIG. 3, the characteristic impedance of the transmitter crystal is measured by suitable apparatus 28 to yield an output proportional to $\rho c$, as indicated. In FIG. 5 a simple multiplying device is shown. The output of 28 is supplied to a linear potentiometer 45 and the potentiometer slider 46 is coupled by rod 47 and gear box 44 to shaft 42 so that the movement of slider 46 is proportional to the angular rotation of shaft 42. This multiplies the beam displacement and the characteristic impedance, and the voltage output at slider 46 is proportional to rate of mass flow. This is indicated by meter 31. As in the case of FIG. 3, if total mass flow is desired a time integrating meter may be employed.

The details of suitable choppers, amplifiers and follow-up mechanisms are well-known in the art and need not be described herein. Inasmuch as the outputs of the receiver transducers 17 and 18 are maintained equal during measurement, no error results if the total beam power impinging thereon varies, since both outputs will vary proportionately. Also, the shape of the beam cross-sectional area is not critical.

Instead of moving the receiving transducers 17, 18, the follow-up mechanism could be arranged to move the transmitting transducer 16 until the receiver outputs are equal.

While arrangements such as that shown in FIG. 5 are useful for eliminating the effect of variations in beam attenuation at the receiving transducers, other arrangements are possible which do not require transducer movement. This may be accomplished by obtaining a signal proportional to received beam intensity, in addition to the difference signal. The additional signal may then be employed either to control the transmitter or to introduce an appropriate modifying factor at the receiver.

Referring to FIGS. 6(a) and 6(b), an undisplaced sonic beam shown by the dotted lines 51 impinges equally on crystals 17 and 18. The beam is assumed to have a rectangular cross-section of height $h$ and width $w$ as shown in FIG. 6(b) and, with a very small separation between crystals, approximately one-half of the beam impinges on each. Under such conditions, the outputs of the crystals are equal and may be expressed as:

$$e_1 = e_2 = Ihw/2 \qquad (6)$$

Here $I$ is the intensity of the beam at the crystals. If the beam shifts downward an amount $\eta$ due to the downward flow of liquid, as shown by lines 51', $e_1$ will decrease and $e_2$ will increase. The difference of the two voltages is then:

$$e_2 + e_1 = 2Ih\eta \qquad (7)$$

The sum of the two voltages will be:

$$e_2 + e_1 = Ihw \qquad (8)$$

Now, if the difference of the output voltages is divided by the sum, the following is obtained:

$$\eta = \frac{w}{2} \frac{e_2 - e_1}{e_2 + e_1} \qquad (9)$$

Equation 9 is independent of the intensity of the received beam since, although intensity affects each individual voltage, when the different is divided by the sum the quantity $I$ cancels out. The beam width is determined largely by the area of the transmitting crystal and the frequency of operation, and therefore is a constant in a given system. For cross-sectional beam areas other than rectangular, the results are similar although the mathematics will differ in detail.

Figures 7, 9:
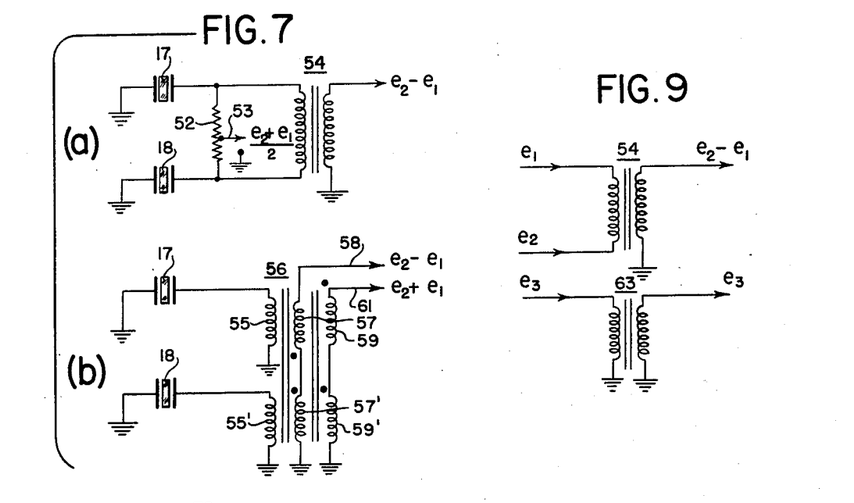

When two receiving crystals are employed, the sum and difference voltages can readily be obtained in many ways known in the art. FIG. 7 shows two examples of simple circuits to this end.

In FIG. 7(a) the output voltages of crystals 17 and 18 are applied to a center-tapped resistor 52 and the voltage at the center tap 53 is equal to one-half the sum of the voltages, as shown. The outputs of the two crystals are also supplied to the primary of transformer 54, and the secondary voltage will be proportional to the difference in the crystal output voltages, as indicated.

In FIG. 7(b), the outputs of crystals 17 and 18 are supplied to independent primary windings 55, 55' of transformer 56. A pair of secondary windings 57, 57' are connected in series opposition as indicated by the dots adjacent thereto, and the output voltage in line 58 is proportional to the difference in the crystal outputs. A pair of additional windings 59, 59' are connected in series aiding, and the corresponding output in line 61 is proportional to the sum of the crystal voltages.

Figure 8:
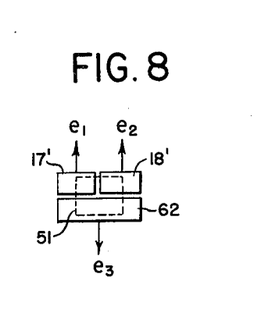

FIG. 8 shows another arrangement which may be used for the purpose. Here receiver crystals 17' and 18' are arranged similarly to those in FIG. 6, except that their height is somewhat less so that only a portion of the height of the beam 51 impinges thereon. A third crystal 62 is arranged to be impinged by the lower half of beam 51 and is sufficiently wide to encompass the beam excursions. Accordingly, when the beam is deflected the portion of the beam impinging on crystal 62 remains constant, so that the output $e_3$ of crystal 62 will be independent of beam displacement but will vary with beam intensity.

FIG. 9 shows a transformer 54 for obtaining the difference voltage from crystals 17' and 18' as described in connection with FIG. 7(a). An additional transformer 63 is provided for yielding an output voltage proportional to the output of crystal 62. Transformer 63 could, of course, be omitted if desired, but facilitates stepping up (or down) the voltage, and maintains phase relationships similar to that of transformer 54. It is not necessary that one-half the received beam impinge on the third crystal, as shown, so long as the portion of the beam remains constant as the deflection changes. Suitable proportionality constants may readily be introduced by means of transformers, amplifiers, etc., as will be understood.

Figure 6:
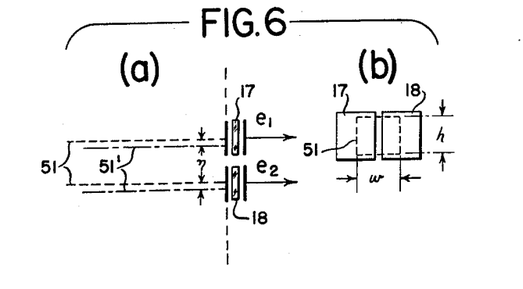
FIGS. 6 through 9 are details showing different arrangements for obtaining outputs varying with beam displacement and also outputs varying with beam intensity.

Since the voltage $e_3$ of FIGS. 8 and 9 will be proportional to the sum of voltages $e_1$ and $e_2$, it can be used in place of the sum voltage described in connection with FIGS. 6 and 7. For convenience, in the following description the term "sum voltage" will be employed, it being understood that it can be obtained either by adding $e_1$ and $e_2$, or by deriving a separate voltage proportional thereto, as desired.

Figure 10:
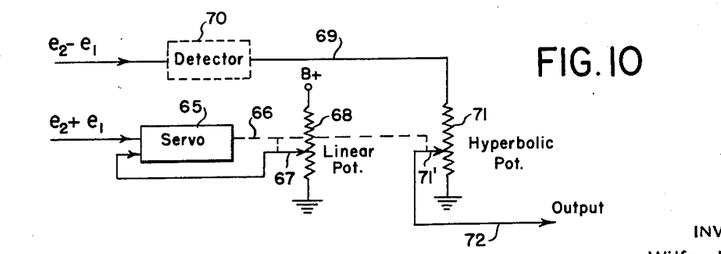
FIG. 10 shows an arrangement for rendering the displacement output independent of variations in attenuation of the sonic beam.

FIG. 10 shows one way in which the two responses may be employed at the receiver to yield an output proportional to beam displacement, but independent of received beam intensity. In this embodiment the responses corresponding to beam displacement and received beam intensity are divided so that the ratio of the two responses is constant at any given beam displacement, but varies as the displacement changes.

The sum voltage is applied to a servo 65 whose output shaft 66 controls the position of slider 67 on a linear potentiometer 68 energized from a suitable D.-C. voltage source denoted B+. The voltage at slider 67 is fed back to the input of servo 65, and the servo shaft 66 moves the slider until the slider voltage is equal to the input voltage. Ordinarily, the fed back voltage and the applied voltage are compared as D.-C. voltages. Accordingly, servo 65 may contain a rectifier for converting the input sum voltage to a corresponding D.-C. voltage, or rectification may be employed ahead of the servo.

The difference voltage is supplied through line 69 to a hyperbolic potentiometer 71, and the position of the slider 71' is controlled by servo 65. The mechanical connection of sliders 67, 71' to the servo shaft 66 is such that they move in opposite directions in the schematic diagram of FIG. 10. Thus, the resistance between slider 71' and ground is always inversely proportional to the sum voltage. The output voltage in line 72 will then be proportional to the difference voltage divided by the sum voltage, as shown on the right hand side of Equation 9, and is therefore proportional to beam displacement but independent of beam intensity. When multiplied by the characteristic impedance, an output is obtained which is proportional to mass flow. For example, the output in line 72 may be supplied to the multiplier 29 in FIG. 3 along with the output from 28 to yield an indication of mass flow on meter 31. Where a D.-C. signal is desired for multiplying, a detector 70 may be inserted in line 69 as shown, or in line 72 ahead of the multiplier.

In many applications fluid flow is always in one direction, and it is unnecessary to provide for situations where fluid may flow in the opposite direction during the course of measurement. For applications where fluid flow in opposite directions must be taken into account, suitable provision can be made to determine the direction of the difference voltage, that is, for determining when $e_2$ exceeds $e_1$, and vice versa. The resultant voltage may be multiplied by the characteristic impedance to yield positive and negative values corresponding to flow in forward and reverse directions.

The embodiments thus far described are usable for unidirectional flow, and, with slight changes, can be adapted for bidirectional flow. For example, the subtractor 27 in FIG. 3 may be of a type which will give one polarity when the output of receiver transducer 18 exceeds that of 17, and the opposite polarity when the output of 17 is greater. One such subtractor is a differential amplifier which will be described in connection with FIG. 14.

In FIG. 5, the follow-up mechanism is inherently bidirectional. Thus, by employing a center-tapped potentiometer 45, with the center tap grounded and the voltage representing $k_\rho c$ applied to the ends of the potentiometer, the polarity of the voltage at slider 46 will reverse as it goes from one side of the center tap to the other. If, then, the rod 47 is adjusted so that slider 46 is at the center tap for zero flow, the direction as well as magnitude of fluid flow will be indicated.

Figure 11:
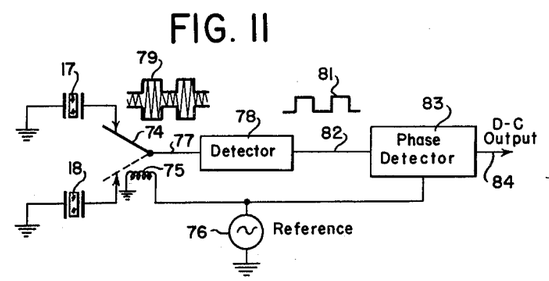
FIG. 11 shows an arrangement useful for bidirectional fluid flow.

FIG. 1 shows another way in which the direction as well as the magnitude of the difference voltage can be determined. Here the outptus of receiver crystals 17 and 18 are supplied to a simple chopper which takes the form of a switch arm 74 alternately switched from the position shown to the dotted position by a solenoid 75 energized with A.-C. current from reference source 76. It is desirable to move switch 74 from one position to the other quickly, so as to avoid lost time. A sine wave reference voltage of sufficient amplitude may be employed, or a square wave.

If the outputs of crystals 17 and 18 are equal, a continuous wave of constant amplitude and a frequency equal to that of the ultrasonic beam will be present in line 77. Upon passing through detector 78 a zero D.-C. output will be obtained. However, if the output of one crystal is greater than that of the other, a modulated wave similar to that depicted at 79 will be obtained. The larger amplitude of the modulation will correspond to the larger output voltage. Upon passing through detector 78, the wave will be demodulated and a substantially square wave, such as depicted at 81, will be fed through line 82 to the phase detector 83. The frequency of the square wave will be determined by the switching frequency and its amplitude will be proportional to the difference between the output voltages of 17 and 18. The square wave 81 will have one phase when the output of crystal 17 is greater, and an opposite phase (180°) when the output of crystal 18 is greater.

Figure 11A:
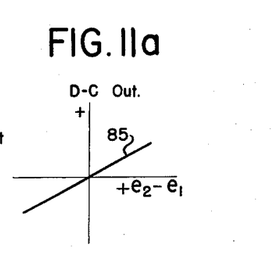
FIG. 11a is an illustrative curve showing the output of the device of FIG. 11.

The square wave is supplied to a phase detector 83 which is also supplied with the reference voltage from source 76. Accordingly, a D.-C. output will be obtained in line 84 which is zero when the outputs of crystals 17 and 18 are equal. For unequal crystal outputs, the D.-C. output voltage will be proportional to the difference therebetween, and the polarity will be determined by which crystal output is the greater. This relationship is shown by line 85 in FIG. 11(a). Hence, the D.-C. output in line 84 varies in amplitude with flow velocity, and in polarity with the direction of flow.

The arrangement of FIG. 11 may be employed in the embodiments thus far described (except FIG. 5 where it is unnecessary), with suitable provision for insuring that when the D.-C. output in line 84 changes polarity a corresponding change in polarity will take place in the mass flow indication. Advantageously, the sum voltage is employed to render the indication independent of beam intensity.

For example, if the output in line 84 of FIG. 11 is supplied to the input line 69 of FIG. 10, the output in line 72 of FIG. 10 will vary in polarity depending on the polarity in line 84, and will also be corrected by the servo mechanism for changes in beam intensity. This corrected output can then be multiplied by the ouput corresponding to characteristic impedance so as to obtain mass flow.

Figure 12:
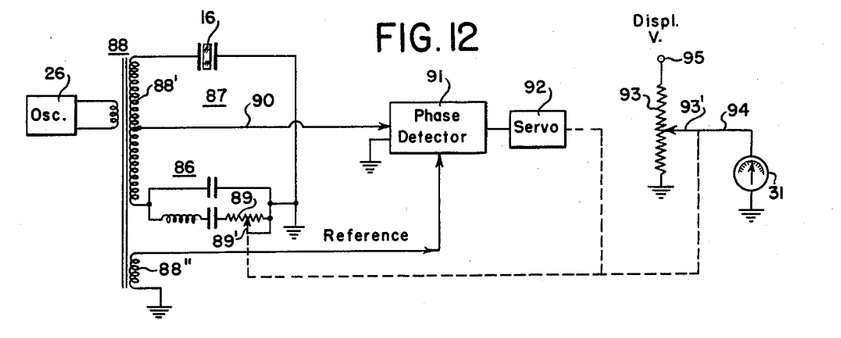
FIG. 12 shows another arrangement for measuring characteristic impedance.

FIG. 12 shows another arrangement for measuring the characteristic impedance, and combining the measurement with the difference voltage to obtain mass flow. Here a bridge circuit 87 has the transmitter crystal 16 and an equivalent circuit 86 connected to the center-tapped secondary 88' of a transformer 88 fed from oscillator 26. The components of the equivalent circuit 86 are selected to simulate the impedance of crystal 16 when loaded by the fluid.

As pointed out in connection with FIG. 4, resistor 89 represents the characteristic impedance of the fluid loading the crystal, and is here made variable so that the bridge can be balanced throughout the range of characteristic impedances expected to be encountered. The center tap of secondary 88' is connected through line 90 to the phase detector 91, and the latter is supplied with a reference voltage derived from a tertiary winding 88" on the transformer.

If the value of resistance 89 equals the load impedance of the crystal 16, the bridge will be balanced and the voltage in line 90 will be zero. However, if the value of resistor 89 is not correct, the bridge will be unbalanced and a corresponding voltage will be supplied to the phase detector 91. The phase of the voltage in line 90 with respect to the reference voltage from the tertiary winding will depend on whether the load impedance is greater or less than the value of resistor 89, and the polarity of the D.-C. output of the phase detector will vary accordingly.

The output of the phase detector is supplied to the servo 92 and the output of the servo is coupled to the slider 89' so as to change the value of the variable resistor 89. Therefore, as the characteristic impedance of the fluid changes the value of resistance 89 will be changed so that the bridge is always in balance.

The output of servo 92 is employed to move the slider 93' of linear potentiometer 93 so that the resistance from the slider to ground is proportional to the characteristic impedance. The input to the potentiometer is the beam displacement voltage, either $e_2-e_1$ or the D.-C. equivalent thereof, so that the output in line 94 is proportional to mass flow and is indicated on meter 31. Advantageously, the beam displacement voltage applied to potentiometer 93 is corrected by the sum voltage. For example, the output in line 72 of FIG. 10 can be applied to the input terminal 95 of the potentiometer 93 in FIG. 12. When it is required to indicate mass flow in both directions, the arrangement of FIG. 11 may additionally be employed, as already described.

With the impedance of the equivalent circuit 86 equal to that of crystal 16, half the driving power is dissipated in resistor 89. By changing the tapping point on secondary 88′ and making a corresponding change in the impedance of the equivalent circuit, the dissipated power can be made a small fraction of the transmitted power.

Ordinarily crystal 16 will be operated at or near resonance for maximum efficiency, and the relatively simple equivalent circuit shown at 86 suffices for adequate balancing. However, if it is desired to operate the crystal considerably away from resonance, a more elaborate equivalent circuit may be employed.

Figure 13:
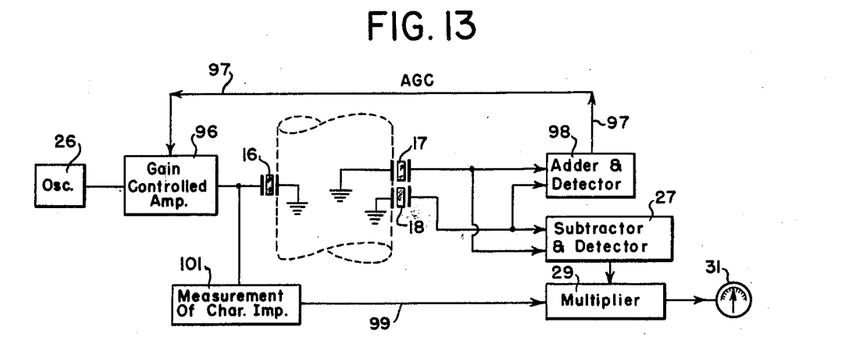
FIG. 13 shows another arrangement in which the displacement output is rendered independent of variations in beam attenuation.

It is also possible to employ the sum voltage to control the input to the transmitter crystal so as to maintain constant the beam intensity at the receiver crystals. This arrangement is shown in FIG. 13. Here the oscillator 26 is connected to the transmitter crystal 16 through an amplifier 96 whose gain can be controlled by a signal applied through line 97. The output signals from receiver crystals 17 and 18 are supplied to the adder and detector 98 to produce a D.-C. voltage in line 97 which varies with the sum of the outputs. This D.-C. voltage is fed back to amplifier 96 to control the gain thereof. With sufficient gain in the adder and detector 98, the beam intensity at the receiver crystals can be made substantially constant, even though the attenuation of the beam varies as it passes through the fluid.

The outputs of receiver crystals 17 and 18 may be added as described hereinbefore and then detected to obtain a correspondingly varying D.-C. voltage, or the outputs can be individually detected to obtain corresponding D.-C. signals which can then be added, amplified and fed back to amplifier 96.

The outputs of the receiver crystals are also supplied to the subtractor and detector 27 to obtain a D.-C. output varying with beam displacement, and this output is supplied to multiplier 29.

In this embodiment, the input to the transmitter crystal 16 will vary in accordance with the gain control, so that the manner of measuring the characteristic impedance described in connection with FIG. 4 will no longer suffice. However, by using the bridge arrangement of FIG. 12, the resistance of 89 varies with the characteristic impedance and can be used to produce a signal in line 99 which varies with the characteristic impedance. Such measuring equipment is shown diagrammatically at 101 and can take many different forms as will be clear to those skilled in the art. The output in line 99 is supplied to multiplier 29, and the output of the multiplier is supplied to meter 31 to indicate mass flow.

Figure 14:
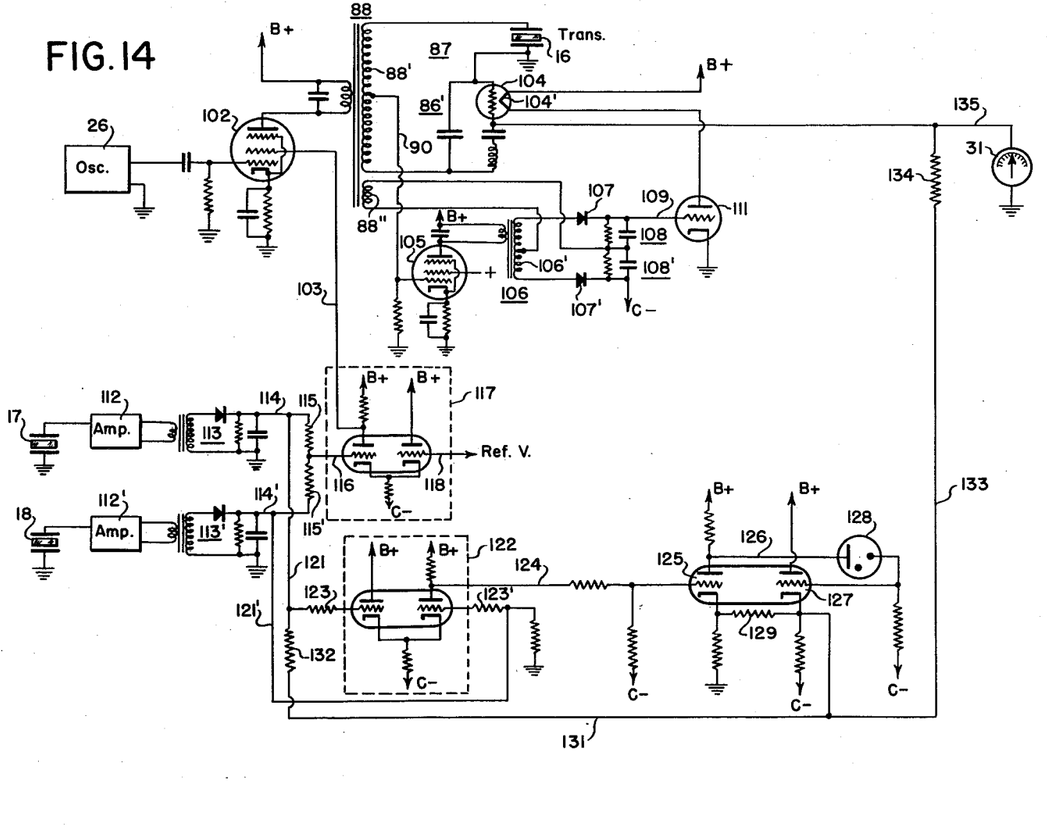
FIG. 14 is a circuit diagram of a preferred embodiment of the invention.

Referring now to FIG. 14, a schematic circuit diagram is shown giving detailed circuit arrangements for carrying out operations hereinbefore described. In this embodiment, the characteristic impedance is measured by the bridge arrangement of FIG. 12, and the sum voltage is employed to control the input to the transmitter crystal. The output of oscillator 26 is supplied to a pentode amplifier tube 102 whose gain can be controlled by the voltage applied to the screen grid thereof through line 103. The output of the amplifier is supplied to the primary of transformer 88 having a center-tapped secondary winding 88′.

The transmitter crystal 16 is arranged in a bridge circuit including the equivalent circuit 86′. This equivalent circuit is like that shown at 86 in FIG. 12 except that here the variable resistor 89 is replaced by a thermistor 104 whose resistance can be varied by changing the heating current supplied to the heater 104′. The center tap of secondary 88′ is connected through line 90 to the grid of an amplifier tube 105, here shown as a pentode. The amplified output is then supplied to the primary of transformer 106 which has a center-tapped secondary 106′.

A phase detector of the discriminator type is here employed. The secondary 106′ is connected through diodes 107, 107′ to parallel R-C circuits 108, 108′. The reference voltage from tertiary 88″ is applied between the center tap of secondary 106′ and the common connection between the R-C circuits 108, 108′. Accordingly, the output voltage of the discriminator at line 109 is zero when the bridge 87 is balanced, since under these conditions the voltage in line 90 is zero and no A.-C. current flows in the output circuit of amplifier 105. When the bridge is unbalanced, a corresponding D.-C. voltage is produced in line 109 whose polarity is determined by the direction of unbalance.

The output in line 109 is supplied to the grid of an amplifier tube 111, here shown as a triode. Grid bias is obtained by a suitable negative power supply denoted C—. The plate of amplifier tube 111 is connected through the thermistor heater 104′ to a suitable power supply voltage denoted B+. Accordingly, the heating of thermistor 104 is controlled to rebalance the bridge 87 whenever the balance is altered by a change in characteristic impedance of the fluid loading the transmitter crystal 16. The resistance of the thermistor 104 therefore varies with the characteristic impedance. It is used in conjunction with an output representing beam displacement in a manner which will be described later.

In place of the thermistor 104, other thermally-sensitive resistance devices may be employed, with appropriate changes in the circuit connections where required. As will be described, the D.-C. value of the resistance is used in multiplying with the beam displacement measurement, and it is therefore advantageous to use a resistance device whose resistance at the A.-C. operating frequency is equal or proportional to its D.-C. resistance. If desired, a mechanically varied resistance can be employed, as illustrated in FIG. 12.

The development of the displacement signal will be described next. The outputs of receiver crystals 17 and 18 are supplied through respective amplifiers 112, 112′ to the diode detector circuits 113, 113′. The details of such circuits are well known and need not be described. The outputs of the detector circuits are supplied through lines 114 and 114′ to a pair of series resistors 115, 115′. Thus, the voltage at line 116 is proportional to the sum of the D.-C. outputs of the detectors. This sum voltage is supplied to an amplifier indicated generally at 117.

As here shown, amplifier 117 is a differential amplifier with the sum voltage applied to one input through line 116 and the other input 118 maintained at a constant reference voltage. The output of the amplifier is equal to the amplified difference between the input voltage in line 116 and the reference voltage, and is supplied through line 103 to control the gain of amplifier 102. Thus, whenever the voltage proportional to the sum of the outputs of receiver crystals 17, 18 tends to vary, the amplification of amplifier 102 is changed, thereby maintaining the received beam intensity constant at the receiver crystals. The reference voltage at line 118 may be adjusted to provide the desired operating point for amplifier 102, as will be understood. The details of differential amplifiers are well known in the art and need not be described here.

The outputs of detectors 113, 113′ are also supplied through lines 121, 121′ to the inputs of the differential amplifier 122 through series grid resistors 123, 123′. Thus, an output voltage is obtained at line 124 which is proportional to the difference in the outputs of the receiver crystals. This is D.-C. coupled to the input of amplifier section 125, and the amplified voltage in line 126 is supplied to the input grid of amplifier section 127 through a gas-discharge tube 128 which may be of the voltage-regulator or neon-tube type. Regenerative feedback is obtained through resistor 129 connected between the cathodes of tube sections 125 and 127. Overall negative feedback is obtained by connecting the cathode of tube section 127 through line 131 and resistor 132 to an input of the differential amplifier 122 as shown.

The amplifying channel including differential amplifier 122 and tube sections 125 and 127 is conventional and well known in the analogue computer field. It provides stable operation, adequate gain and a low output impedance, and hence is suitable for present purposes. However, many other suitable circuits are known in the art and may be employed as desired.

The output of the amplifier, proportional to the difference between the receiving crystal outputs, is supplied through line 133 to a series circuit including resistor 134 and the thermistor 104 to ground. As previously described, the resistance of thermistor 104 is proportional to the characteristic impedance of the fluid. By making resistor 134 large compared to the resistance of the thermistor, a current proportional to the voltage of line 133 flows through the thermistor and the voltage across the thermistor is the product of this current and the thermistor resistance. Thus a voltage is obtained at line 135 which is proportional to the product of the beam displacement and the characteristic impedance. The voltage is therefore proportional to mass flow and may be indicated by a suitable meter 31.

In addition to indicating mass flow independent of beam attenuation in the fluid, the arrangement of FIG. 14 will respond to bidirectional fluid flow. This is accomplished by applying the receiving crystal outputs, after detection, independently to the inputs of differential amplifier 122. Thus the output of amplifier 122 will vary in opposite directions for opposite directions of flow. By employing a zero-center meter for meter 31, both direction and rate of mass flow can be indicated. Also, with a suitable integrating meter, the net mass flow can be indicated.

In the arrangement of FIG. 1, the sonic beam traverses the fluid stream only once in reaching the receiver crystals, and this has been indicated schematically in other figures. This is a simple arrangement and will usually be found adequate. However, it is possible to arrange one or more plane faces or facets on the inside wall of the conduit so that the sonic beam will be reflected one or more times before impinging on the receiver transducers. Thus for a given conduit the total path length of the sonic beam will be increased, and the beam displacement at the receiver transducers will be greater for a given flow. With a suitable reflector arrangement, the receiver transducers could be placed on the same side of the conduit as the transmitter.

In general, it is desirable to avoid the building up of standing waves between transmitter and receiver transducers, since the measurement of characteristic impedance may be affected thereby. To reduce such standing waves, it is desirable to match the receiving transducers to the characteristic impedance of the fluid as closely as possible, by suitable mechanical or electrical terminations. This reduces the energy reflected back to the transmitting transducer. The use of narrow beams is also helpful, since the reflected energy may be carried downstream sufficiently to prevent its return to the transmitter in many applications.

Where required, the sonic energy may be transmitted as pulses, rather than a continuous wave. In such case it is desirable to make the pulse duration short enough so that the transmitting transducer is no longer active by the time the first reflected energy returns to it. The pulse repetition frequency is advantageously low enough so that reflected energy from one pulse decays to a negligible value before the transmission of the next pulse.

For greatest accuracy it is desirable to have laminar flow of the fluid in the measuring region and, where required, suitable flow straighteners may be employed.

As described, a single transmitting transducer is employed for measuring beam displacement and characteristic impedance. However, a separate transducer could be employed for measuring characteristic impedance if desired. The single transducer is preferred since the measurements of the two quantities are for the same elemental volume of fluid, and this promotes accuracy with fluids of changing characteristic impedance. Also the equipment is simplified and possible interference in measuring the two quantities due to the presence of two sonic transmissions is avoided.

In the foregoing embodiments a number of features of the invention have been described, and suitable instrumentation for carrying out the various operations has been described. It will be understood that the various features may be employed singly or in combination as meets the requirements of a given application. Also, many different forms of instrumentation are known in the art for carrying out the various operations described herein, and may be selected as meets the requirements of a particular application.

The embodiments specifically described are directed to the measurement of mass flow, but it will be understood that many features can be employed in the measurement of fluid velocity or volume flow. In some applications it may be desired to measure the relative velocity between a fluid and a body, and an enclosing conduit may be dispensed with. In such cases the flow of the fluid past the body may be used to indicate the speed of the body relative to the fluid, for example, to measure the speed of ships in water or the indicated airspeed of aircraft.

I claim:

1. A flowmeter for indicating flow of a fluid stream which comprises a transmitting transducer for transmitting a beam of sonic energy across said stream, a power source connected to energize said transmitting transducer, receiving transducer means positioned to receive said sonic beam after traversal thereof across said stream, said receiving transducer means including at least two receiving transducers spaced in the direction of fluid flow whereby the relative outputs thereof vary with beam displacement, means connected to receive the outputs of said two receiving transducers and produce a first response proportional to the difference between said outputs, means connected to said receiving transducer means for obtaining a second response proportional to the received beam intensity, means responsive to said second response for controlling the power supplied to said transmitting transducer to maintain the received beam intensity substantially constant, and indicating means responsive to said first response for indicating fluid flow.

2. A flowmeter for indicating mass flow of a fluid stream which comprises a transmitting piezoelectric crystal for transmitting a beam of sonic energy across said stream, an A.-C. power source, an electrical equivalent circuit of said crystal including a resistance variable to simulate substantially the load impedance presented to said crystal by said fluid, said crystal and equivalent circuit being connected in a bridge arrangement with said power source to yield an A.-C. output when the bridge is unbalanced, control means responsive to said A.-C. output for varying said resistance to maintain said bridge in balance, a pair of adjacent receiving transducers positioned to receive said sonic beam after traversal thereof across said stream, said receiving transducers being spaced in the direction of fluid flow, means responsive to the outputs of said receiving transducers for obtaining a response varying with displacement of said beam in the traversal thereof across the stream, and means for obtaining an output proportional to the product of said resistance and said response.

3. A flowmeter for indicating mass flow of a fluid stream which comprises a transmitting transducer for transmitting a beam of sonic energy across said stream, a power source connected to energize said transmitting transducer, receiving transducer means positioned to receive said sonic beam after traversal thereof across said stream, said receiving transducer means including at least two receiving transducers spaced in the direction of fluid flow whereby the relative outputs thereof vary with beam displacement, means connected to receive the outputs of said two receiving transducers and produce a first response proportional to the difference between said outputs, means connected to said receiving transducer means for obtaining a second response proportional to the received beam intensity, means responsive to said second response for controlling the power supplied to said transmitting transducer to maintain the received beam intensity substantially constant, means responsive to variations in the characteristic impedance of said fluid for obtaining an output varying therewith, means for multiplying said first response and the last-mentioned output to obtain a resultant output, and indicating means responsive to said resultant output.

4. A flowmeter for indicating mass flow of a fluid stream which comprises a transmitting transducer for transmitting a beam of sonic energy across said stream, a power source connected to energize said transmitting transducer, receiving transducer means positioned to receive said sonic beam after traversal thereof across said stream, said receiving transducer means including at least two receiving transducers spaced in the direction of fluid flow whereby the relative outputs thereof vary with beam displacement, means connected to receive the outputs of said two receiving transducers and produce a first response proportional to the difference between said outputs, means connected to said receiving transducer means for obtaining a second response proportional to the received beam intensity, means responsive to said second response for controlling the power supplied to said transmitting transducer to maintain the received beam intensity substantially constant, means connected with said transmitting transducer for obtaining an output proportional to the load impedance presented to said transducer by said fluid, means for multiplying said first response and the last-mentioned output to obtain a resultant output, and indicating means responsive to said resultant output.

5. A flowmeter for indicating mass flow of a fluid stream which comprises a transmitting piezoelectric crystal for transmitting a beam of sonic energy across said stream, an A.-C. power source, an electrical equivalent circuit of said crystal including a resistance variable to simulate substantially the load impedance presented to said crystal by said fluid, said crystal and equivalent circuit being connected in a bridge arrangement with said power source to yield an A.-C. output when the bridge is unbalanced, control means responsive to said A.-C. output for varying said resistance to maintain said bridge in balance, receiving transducer means positioned to receive said sonic beam after traversal thereof across said stream, said receiving transducer means including at least two receiving transducers spaced in the direction of fluid flow whereby the relative outputs thereof vary with beam displacement, means connected to receive the outputs of said two receiving transducers and produce a first response proportional to the difference between said outputs, means connected to said receiving transducer means for obtaining a second response proportional to the received beam intensity, means responsive to said second response for controlling the power supplied to said bridge arrangement to maintain the received beam intensity substantially constant, and means for obtaining an output proportional to the product of said resistance and said first response.

6. A flowmeter for indicating mass flow of a fluid stream which comprises a transmitting piezoelectric crystal for transmitting a beam of sonic energy across said stream, an A.-C. power source having a frequency approximately equal to the resonant frequency of the crystal, an electrical equivalent circuit of said crystal including a resistance variable to simulate substantially the load impedance presented to said crystal by said fluid, said crystal and equivalent circuit being connected in a bridge arrangement with said power source to yield an A.-C. output when the bridge is unbalanced, control means including a phase detector supplied with a reference voltage from said power source and responsive to said A.-C. output for varying said resistance to maintain said bridge in balance, receiving transducer means positioned to receive said sonic beam after traversal thereof across said stream, said receiving transducer means including at least two receiving transducers spaced in the direction of fluid flow whereby the relative outputs thereof vary with beam displacement, means connected to said receiving transducer means for obtaining a signal proportional to the received beam intensity, means responsive to said signal for controlling the power supplied to said bridge arrangement to maintain the received beam intensity substantially constant, a pair of detectors connected to receive the outputs of said two receiving transducers for obtaining respectively corresponding D.-C. outputs, means for subtracting said D.-C. outputs to obtain a resultant signal proportional to beam displacement and of opposite polarity for fluid flow in opposite directions, multiplying means for obtaining an output proportional to the product of said resistance and said resultant signal, and an indicator responsive to the last-mentioned output for indicating mass flow.

References Cited by the Examiner

UNITED STATES PATENTS

| | | | |
|---|---|---|---|
| 2,514,235 | 7/50 | Genin et al. | 73—194 |
| 2,627,543 | 2/53 | Obermaier | 73—194 |
| 2,711,646 | 6/55 | Mendousse. | |
| 2,739,478 | 3/56 | Offner | 73—205 X |
| 2,779,931 | 1/57 | Hersey | 73—194 |
| 2,874,568 | 2/59 | Petermann | 73—194 |
| 2,911,825 | 11/59 | Kritz | 73—194 |
| 2,911,826 | 11/59 | Kritz | 73—194 |
| 2,912,856 | 11/59 | Kritz | 73—194 |
| 2,923,155 | 2/60 | Welkowitz | 73—194 |
| 2,959,054 | 11/60 | Welkowitz | 73—194 |

FOREIGN PATENTS 771,637   4/57   Great Britain.

RICHARD C. QUEISSER, *Primary Examiner.*

ROBERT L. EVANS, C. A. CUTTING, *Examiners.*

UNITED STATES PATENT OFFICE
CERTIFICATE OF CORRECTION

Patent No. 3,188,862                                          June 15, 1965

Wilfred Roth

It is hereby certified that error appears in the above numbered patent requiring correction and that the said Letters Patent should read as corrected below.

Column 1, line 67, after "specific" insert -- acoustic --; column 5, line 66, for "highb" read -- high --; column 7, line 12, for "displacemen" read -- displacement --; same column 7, line 63, equation (7) should appear as shown below instead of as in the patent:

$$e_2 - e_1 = 2Ih\eta$$

line 75, for "different" read -- difference --; column 9, line 51, for "FIG. 1" read -- FIG. 11 --; line 53, for "outptus" read -- outputs --; column 10, line 29, for "ouput" read -- output --.

Signed and sealed this 30th day of November 1965.

(SEAL)
Attest:

ERNEST W. SWIDER                                   EDWARD J. BRENNER
Attesting Officer                                   Commissioner of Patents